(12) United States Patent
Davydov et al.

(10) Patent No.: US 9,763,154 B2
(45) Date of Patent: Sep. 12, 2017

(54) APPARATUS AND METHOD FOR CROSS-CARRIER QUASI CO-LOCATION SIGNALING IN A NEW CARRIER TYPE (NCT) WIRELESS NETWORK

(71) Applicants: Alexei Davydov, Nizhny Novgorod (RU); Seunghee Han, Cupertino, CA (US); Gregory V. Morozov, Nizhny Novgorod (RU); Ilya Bolotin, Nizhny Novgorod (RU); Jong-Kae Fwu, Sunnyvale, CA (US)

(72) Inventors: Alexei Davydov, Nizhny Novgorod (RU); Seunghee Han, Cupertino, CA (US); Gregory V. Morozov, Nizhny Novgorod (RU); Ilya Bolotin, Nizhny Novgorod (RU); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 44 days.

(21) Appl. No.: 14/759,116

(22) PCT Filed: Dec. 27, 2013

(86) PCT No.: PCT/US2013/078105
§ 371 (c)(1),
(2) Date: Jul. 2, 2015

(87) PCT Pub. No.: WO2014/107416
PCT Pub. Date: Jul. 10, 2014

(65) Prior Publication Data
US 2015/0341882 A1 Nov. 26, 2015

Related U.S. Application Data

(60) Provisional application No. 61/748,706, filed on Jan. 3, 2013.

(51) Int. Cl.
*H04W 36/14* (2009.01)
*H04W 24/10* (2009.01)
(Continued)

(52) U.S. Cl.
CPC ............ *H04W 36/14* (2013.01); *H04B 7/024* (2013.01); *H04B 7/0486* (2013.01);
(Continued)

(58) Field of Classification Search
CPC ..... H04W 36/14; H04W 12/02; H04W 24/10; H04W 28/0268; H04W 36/0005;
(Continued)

(56) References Cited

U.S. PATENT DOCUMENTS

2013/0250882 A1* 9/2013 Dinan ............... H04W 72/0426
370/329
2013/0279437 A1* 10/2013 Ng ........................ H04W 48/16
370/329
(Continued)

FOREIGN PATENT DOCUMENTS

CN 1120270 A 4/1996
CN 1248848 A 3/2000

OTHER PUBLICATIONS

International Search Report and Written Opinion for PCT Application No. PCT/US2013/078105, mailed on Apr. 22, 2014, 13 pages.
(Continued)

*Primary Examiner* — Obaidul Huq
(74) *Attorney, Agent, or Firm* — Grossman, Tucker, Perreault & Pfleger, PLLC.

(57) ABSTRACT

Generally, this disclosure provides devices, systems and methods for Cross-Carrier Quasi Co-Location Signaling in an NCT Wireless Network. A UE device may include a receiver circuit to receive a QCL signaling message from a primary cell, the QCL signaling message for a configured
(Continued)

secondary cell to identify a primary or one or more secondary cells that are Quasi Co-located with the secondary cell for which the message is provided. The UE device may also include a QCL signal decoding module to decode the QCL signaling message and to determine QCL synchronization parameters. The UE device may further include a synchronization module to synchronize the UE with the primary or one or more secondary cells based on the QCL synchronization parameters obtained from the QCL message received from the primary cell.

24 Claims, 7 Drawing Sheets (51) Int. Cl.
| | | |
|---|---|---|
| H04B 7/06 | (2006.01) | |
| H04B 7/04 | (2017.01) | |
| H04J 11/00 | (2006.01) | |
| H04W 72/04 | (2009.01) | |
| H04B 7/024 | (2017.01) | |
| H04W 56/00 | (2009.01) | |
| H04W 72/00 | (2009.01) | |
| H04W 88/08 | (2009.01) | |
| H04L 29/06 | (2006.01) | |
| H04W 36/00 | (2009.01) | |
| H04W 48/08 | (2009.01) | |
| H04W 68/00 | (2009.01) | |
| H04W 28/02 | (2009.01) | |
| H04W 36/22 | (2009.01) | |
| H04W 48/16 | (2009.01) | |
| H04W 52/02 | (2009.01) | |
| H04W 76/02 | (2009.01) | |
| H04L 12/46 | (2006.01) | |
| H04L 29/12 | (2006.01) | |
| H04W 12/02 | (2009.01) | |
| H04W 88/06 | (2009.01) | |
| H04W 84/12 | (2009.01) | |
| H04L 5/00 | (2006.01) | |
| H04W 88/16 | (2009.01) | |
| H04W 8/08 | (2009.01) | |

(52) U.S. Cl.
CPC ......... *H04B 7/0626* (2013.01); *H04B 7/0632* (2013.01); *H04J 11/0053* (2013.01); *H04L 5/0053* (2013.01); *H04L 12/4641* (2013.01); *H04L 61/2007* (2013.01); *H04L 63/304* (2013.01); *H04L 63/306* (2013.01); *H04W 12/02* (2013.01); *H04W 24/10* (2013.01); *H04W 28/0268* (2013.01); *H04W 36/0005* (2013.01); *H04W 36/0055* (2013.01); *H04W 36/22* (2013.01); *H04W 48/08* (2013.01); *H04W 48/16* (2013.01); *H04W 52/0222* (2013.01); *H04W 56/005* (2013.01); *H04W 56/0015* (2013.01); *H04W 56/0095* (2013.01); *H04W 68/00* (2013.01); *H04W 72/005* (2013.01); *H04W 72/042* (2013.01); *H04W 72/0413* (2013.01); *H04W 76/02* (2013.01); *H04W 76/021* (2013.01); *H04W 76/023* (2013.01); *H04W 88/08* (2013.01); *H04L 5/0057* (2013.01); *H04W 8/082* (2013.01); *H04W 36/0011* (2013.01); *H04W 84/12* (2013.01); *H04W 88/06* (2013.01); *H04W 88/16* (2013.01); *Y02B 60/50* (2013.01)

(58) Field of Classification Search
CPC ............ H04W 36/0055; H04W 48/16; H04W 52/0222; H04W 56/0015; H04W 56/005; H04W 56/0095; H04W 68/00; H04W 72/005; H04W 72/0413; H04W 72/042; H04W 76/02; H04W 76/021; H04W 76/023; H04W 88/08; H04W 8/082; H04W 36/0011; H04W 88/16; H04B 7/024; H04B 7/0486; H04B 7/0626; H04B 7/0632; H04J 11/0053; H04L 5/0053; H04L 12/4641; H04L 61/2007; H04L 63/304; H04L 63/306; H04L 5/0057
USPC .................................. 370/310, 328, 329, 336
See application file for complete search history.

(56) References Cited

U.S. PATENT DOCUMENTS

2013/0301434 A1* 11/2013 Krishnamurthy ..... H04L 1/0026
370/252
2014/0036804 A1* 2/2014 Chen ................. H04W 72/0406
370/329
2014/0198763 A1* 7/2014 Sorrentino ............. H04B 7/024
370/330

OTHER PUBLICATIONS

Nokia, "On Quasi-co-located Antenna Ports," R1-123658, 3GPP TSG RAN WG1 Meeting #70, Qingdao, China, Aug. 13-17, 2012.
Qualcomm Incorporated, "On the need for CSI-RS/CRS quasi-co-location signaling," R1-125101, 3GPP TSG-RAN WG1 #71, New Orleans, USA, Nov. 12-16, 2012.
Alcatel-Lucent, "Further Discussion of Quasi-co-located antenna ports," R1-122458, 3GPP TSG-RAN1 Meeting #69, Prague, Czech Republic, May 21-25, 2012.
Alcatel Lucent, "Updated RRC parameters for EPDCCH," R1-124671, 3GPP TSG RAN WG1 Meeting #70bis, San Diego, USA, Oct. 8-12, 2012.
New Postcom, "Downlink control signalling for PDSCH RE mapping and QCL indicator," R1-124802, 3GPP TSG RAN WG1 #71, New Orleans, USA, Nov. 12-16, 2012.
Chinese Office Action issued in Chinese Application No. 201380061852.5, dated May 3, 2017, with English translation, 25 pages.

* cited by examiner

```
CSI-RS-ConfigNZP-r12 ::=            SEQUENCE (
    csi-RS-IdentityNZP-r12              CSI-RS-IdentityNZP-r11,
    antennaPortsCount-r12               ENUMERATED (an1, an2, an4, an8},
    resourceConfig-r12                  INTEGER (0..31),
    subframeConfig-r12                  INTEGER (0..154),
    scramblingIdentity-r12              INTEGER (0..503),
    qcl-CRS-Info-r12                    SEQUENCE {
        cell
        qcl-ScramblingIdentity-r12          INTEGER (0..503),
        crs-PortsCount-r12                  ENUMERATED (n1, n2, n4, spare1),
        ServCellIndex-r12                   INTEGER (0..7)                      OPTIONAL,    -- Need OR
        mbsfn-SubframeConfig-r12            MBSFN-SubframeConfig                OPTIONAL,    -- Need OR
                                                                                OPTIONAL,    -- Need OR
    },
    ...
```

```
CSI-RS-ConfigNZP-r12 ::=        SEQUENCE {
    csi-RS-IdentityNZP-r12          CSI-RS-IdentityNZP-r11,
    antennaPortsCount-r12           ENUMERATED {an1, an2, an4, an8},
    resourceConfig-r12              INTEGER (0..31),
    subframeConfig-r12              INTEGER (0..154),
    scramblingIdentity-r12          INTEGER (0..503),
    qcl-CRS-Info-r12                SEQUENCE {
        cell
        qcl-ScramblingIdentity-r12      INTEGER (0..503),
        crs-PortsCount-r12              ENUMERATED {n1, n2, n4, spare1},
        ServCellBitMap-r12              BIT STRING                       OPTIONAL,   -- Need OR
        mbsfn-SubframeConfig-r12        MBSFN-SubframeConfig             OPTIONAL,   -- Need OR
    }                                                                    OPTIONAL,   -- Need OR
    ...
}
```

410 → CSI-RS-ConfigNZP-r12

415 → qcl-CRS-Info-r12

420 → ServCellBitMap-r12

APPARATUS AND METHOD FOR CROSS-CARRIER QUASI CO-LOCATION SIGNALING IN A NEW CARRIER TYPE (NCT) WIRELESS NETWORK

CROSS-REFERENCE TO RELATED APPLICATIONS

The present patent application is related to and claims priority to U.S. Provisional Patent Application Ser. No. 61/748,706, filed Jan. 3, 2013, the contents of which are incorporated herein by reference in their entirety.

FIELD

The present disclosure relates to wireless networks, and more particularly, to apparatus and methods for cross-carrier quasi co-location signaling in a New Carrier Type (NCT) wireless network.

BACKGROUND

Wireless networks, for example Long Term Evolution (LTE) and LTE-Advanced (LTE-A) networks, may be heterogeneous networks that include "macro cells," providing higher power/wider area coverage, and "small cells," providing lower power/reduced area coverage. Small cells may include "femto cells," suitable for home or office coverage and "pico cells," for larger indoor environments such as shopping centers. A serving cell for a wireless mobile device, for example User Equipment (UE), may be a base station that includes an evolved Node B (eNB) transceiver to provide network access to the UE within the associated cell coverage area.

As network traffic increases, new system enhancements are being implemented to improve bandwidth utilization and efficiency including the introduction of new carrier types (NCTs), or carriers with reduced overhead, or other backwards compatible carriers, with modified frame structures and synchronization methods. A heterogeneous network may include a mixture of eNBs operating with an NCT and a legacy or Backward-compatible Carrier Type (BCT). Some efforts to increase downlink (DL) throughput may include the reduction or removal of legacy physical control channels or cell specific reference signals (CRS). For example the density of the CRS may be reduced in the frequency domain, the time domain or both, requiring alternative methods for the UE to synchronize with the eNB.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides apparatus and methods for Cross-Carrier Quasi Co-Location Signaling in an NCT Wireless Network. A serving eNB may include a primary carrier and at least one secondary carrier where the primary carrier is a legacy carrier type and the secondary carriers may be a non-standalone NCT. The primary and secondary carriers may be configured as quasi co-located (QCL) carriers, such that, for example, the large-scale properties of the channel between the secondary carrier and the UE may be inferred from the large scale properties of the channel between the primary carrier and the UE. Large scale properties (or QCL synchronization parameters) may include one or more of delay spread, Doppler spread, Doppler shift, average gain and average delay. The primary carrier of eNB may be configured to provide signaling to the UE to identify which secondary carriers are QCL with the primary carrier. In some embodiments, this signaling may also indicate which QCL synchronization parameters may be shared between the primary and secondary carriers. The primary carrier may also be configured to transmit a CRS to the UE from which the UE may obtain these synchronization parameters for communication with both the primary and secondary carriers, eliminating the need for the secondary carrier to transmit CRS signals.

Figure 1:
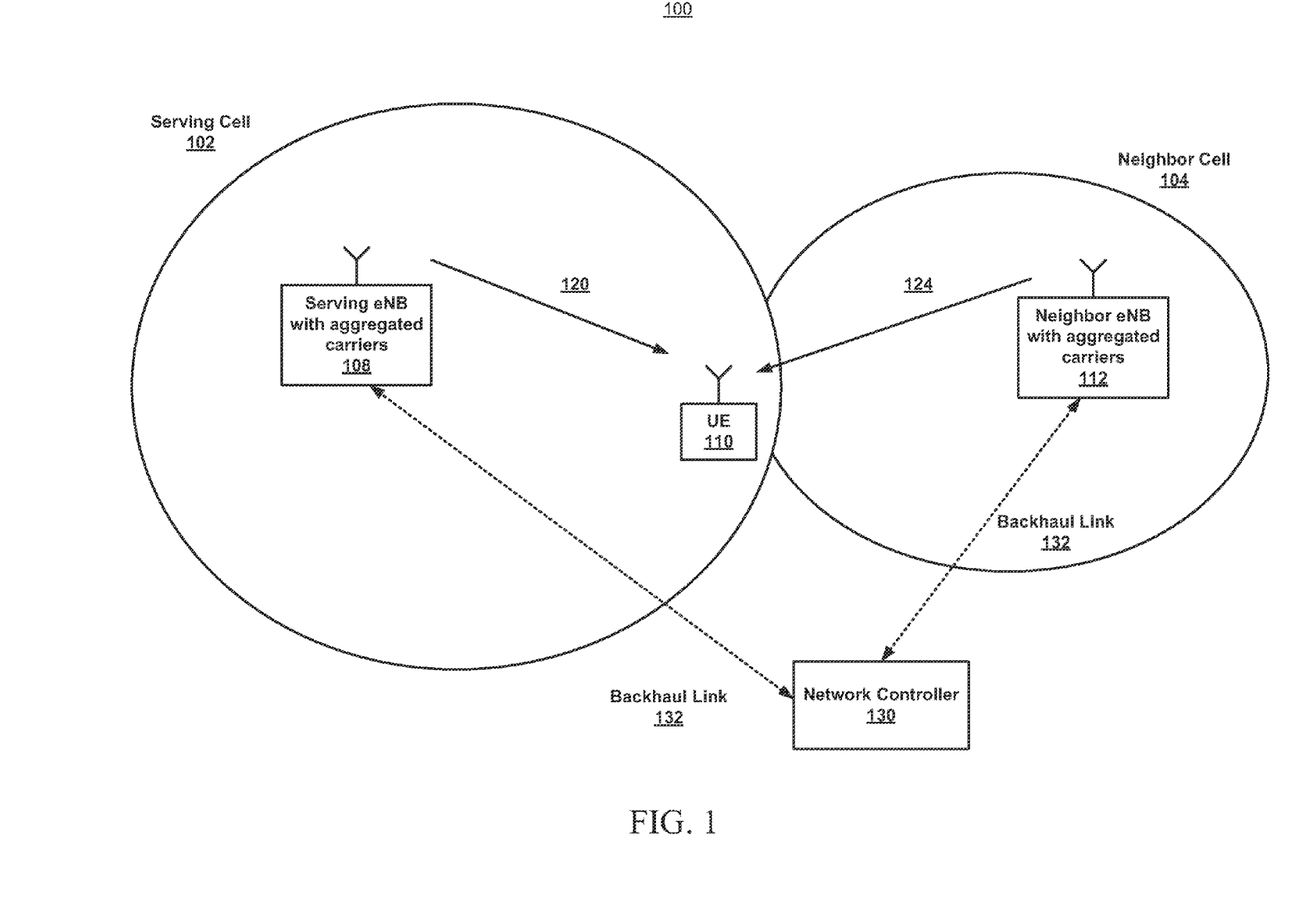
FIG. 1 illustrates a top level system diagram of one example embodiment consistent with the present disclosure.

FIG. 1 illustrates a top level system diagram 100 of one example embodiment consistent with the present disclosure. A heterogeneous wireless network 100 is shown in a simplified form to include a first serving eNB 108, providing cell coverage area 102, for example macro cell coverage, to a UE 110. Serving eNB 108 may include multiple carriers, for example a primary legacy carrier and one or more secondary NCT.

Also shown, is a neighbor cell coverage area 104 served by a second eNB 112 which may also include multiple carriers. The neighbor cell 104 may overlap with the serving cell 102 to some extent. UE 110 may be located near the edge of serving cell 102 where it may be subject to interference from the carriers of neighboring eNB 112. A network controller 130 may be configured to communicate with eNBs of neighboring cells 108 and 112 over backhaul links 132 so that the eNBs may coordinate transmission and blanking, under the various interference mitigation and load balancing techniques including downlink coordinated multi-point (DL CoMP), where interfering eNBs operate on the same carrier frequencies. Embodiments of the present disclosure may also be applied, however, in scenarios where eNBs operate on different carrier frequencies, as will be explained in greater detail below.

During operation, communication 120,124 between eNB and UE may be switched between eNBs, for example between the eNBs 108 and 112, depending on load and interference conditions. In other embodiments, to increase data throughput, the communication 120, 124 between eNBs 108, 112 and UE 110 may be performed simultaneously using multiple aggregated carriers, which may also include NCT. The NCT of eNB, however, may generally refrain from transmitting CRS signals (reference signals which assist in UE-eNB synchronization) to increase bandwidth available for other purposes. Timing and/or frequency synchronization from the primary carrier of eNB may be re-used for the secondary NCT of eNB in some situations, for example when the primary and secondary are co-located and/or intra-band carrier-aggregated on the same eNB. In other embodiment, timing and/or frequency synchronization from one of the secondary carriers of eNB may be re-used for another secondary NCT of eNBs, for example when the secondary carriers are co-located and/or intra-band carrier-aggregated on the same neighboring eNB. The primary carrier of eNB may be configured to provide quasi co-location (QCL) signaling, as will be explained in greater detail below. The QCL signaling may indicate to the UE which reference signals (and associated antenna ports) share a common transmission point and experience the same channel propagation.

While this is a simplified example, for illustration purposes, it will be appreciated that in practice any configuration of eNBs and UEs of various types may be deployed. The wireless network may be a heterogeneous network including New Carrier Type (NCT) and non-NCT (legacy carrier). The NCT may further be classified as standalone or non-standalone configurations. Cells may employ aggregated carriers of different types including legacy carrier, standalone NCT and non-standalone NCT. The heterogeneous wireless network 100 may comply with, or otherwise be compatible with, the Third Generation Partnership Project (3GPP) Long Term Evolution (LTE) and/or LTE-Advanced (LTE-A) based wireless network standard, including current, previous and future versions of that standard.

Figure 2:
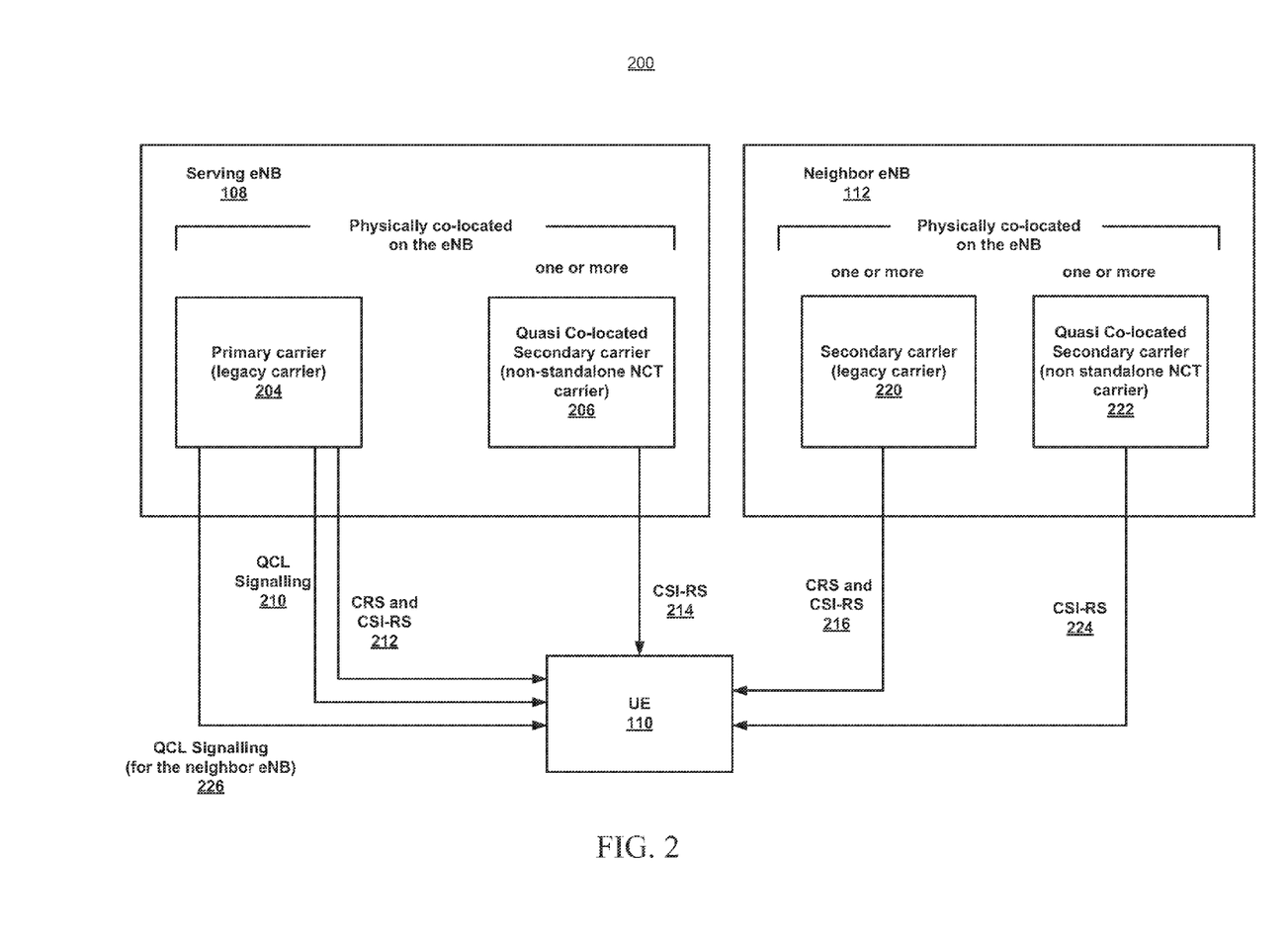
FIG. 2 illustrates a block diagram of one example embodiment consistent with the present disclosure.

FIG. 2 illustrates a block diagram 200 of one example embodiment consistent with the present disclosure. Aggregated carriers of the serving eNB 108 are shown to include a number of physically co-located carriers (e.g., carrier generation modules). A primary carrier 204 may be configured as a legacy carrier type. One or more secondary carriers 206 may be configured as non-standalone NCT carriers. These secondary carriers 206 may also be configured to be quasi co-located with the primary carrier 204. Additional secondary carriers may be configured to be legacy carrier type or NCT non-quasi co-located with the primary carrier 204. These additional carriers may be carriers 220, 222 (e.g., carrier generation modules) of the neighbor eNB 112 configured for the UE 110.

Primary carrier 204 may be configured to transmit both CRS and channel state information reference signals (CSI-RS) signals 212 to UE 110 so that the UE may synchronize with the carrier. The CRS signal may assist the UE with carrier frequency offset estimation, and in some cases with carrier timing estimation, while the CSI-RS signal may be used for carrier timing offset estimation. Secondary carrier 206 of the same eNB 108, however, may be configured to transmit a CSI-RS signal 214 to the UE 110, while being relieved of the overhead of transmitting a CRS signal. This scenario is compatible with transmission mode 10 configured with QCL behavior type B as described in 3GPP TS 36.213, "Evolved Universal Terrestrial Radio Access (E-UTRA) Physical layer procedures," (Release 11).

Primary carrier 204 may further be configured to transmit a QCL signaling message 210 to UE 110 to identify which of the secondary carriers are quasi co-located with the primary carrier 204, so that the UE may synchronize with those secondary carriers 206 using the CRS provided by the primary 204, as described in greater detail below.

Additional carriers that are non-QCL with primary carrier 204 and secondary carriers 206, e.g. transmitted by the neighboring eNB 112, should transmit both CRS and CSI-RS signals 216. If a secondary carrier 222 of neighbor eNB 112 is not transmitting CRS, a QCL signal 226 indicating quasi co-location with another secondary carrier 220 of the same eNB 112 transmitting CRS and CSI-RS is provided to the UE 110.

In some embodiments, the carriers of eNB 112 may also be configured for the UE as secondary carriers and include at least one legacy carrier and a number of physically co-located NCT. Techniques for quasi co-location between secondary carriers described herein may be employed among the carriers of eNB 112 to improve bandwidth utilization by allowing for operation with only one (or a subset) of the transmitting a CRS signal.

Figure 3:
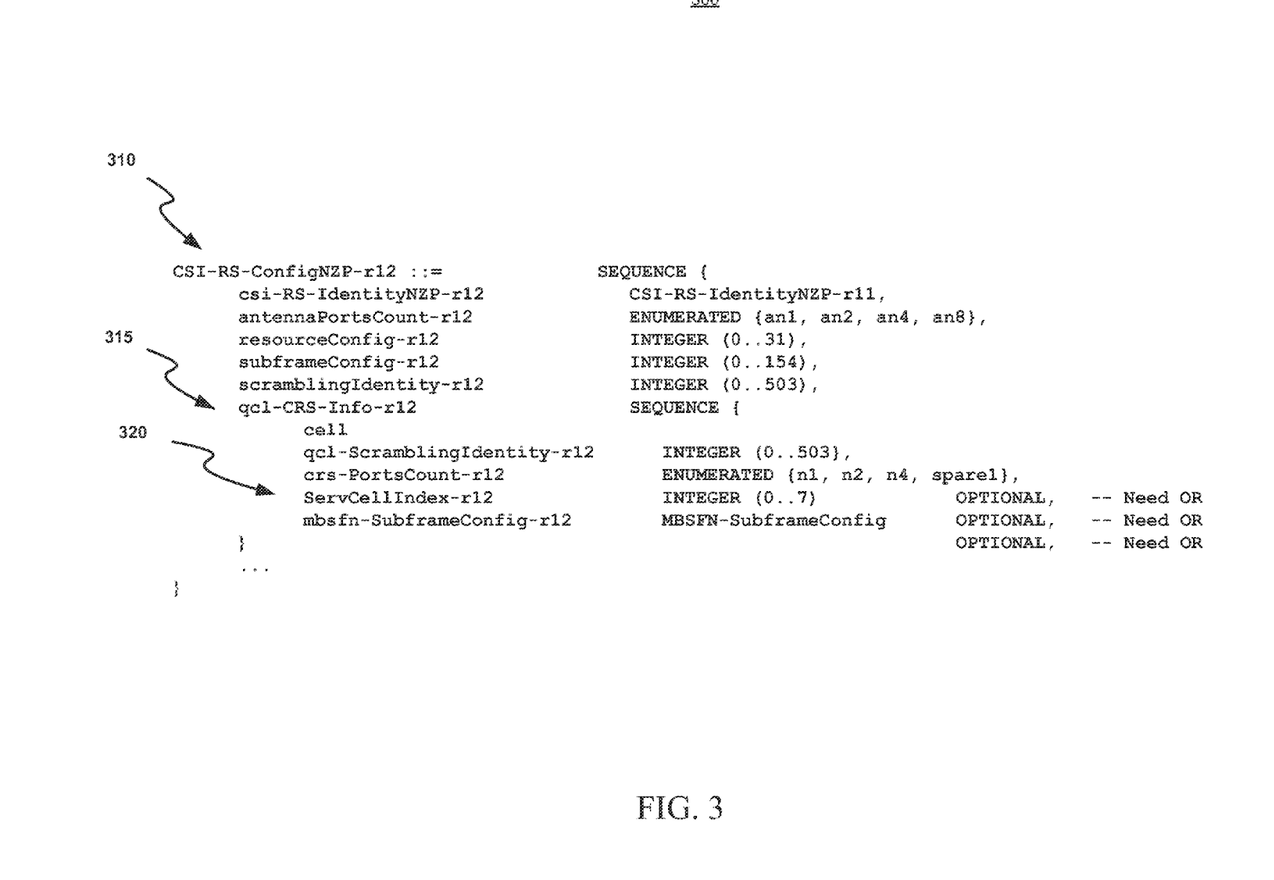
FIG. 3 illustrates a data structure associated with one example embodiment consistent with the present disclosure.

FIG. 3 illustrates a data structure 300 associated with one example embodiment consistent with the present disclosure. In an LTE or LTE-A system, primary carrier 204 may send an RRC message 310 to the UE 110, referred to as CSI-RS-ConfigNZP-r12, which includes a new information field 320, ServCellIndex-r12 within the qcl-CRS-Info-r12 information element 315. The qcl-CRS-Info-r12 information element 315 may be configured when the UE is configured for transmission mode 10 employing QCL behavior type B on that carrier. For each configured secondary carrier 206 of eNB 108 or secondary carrier 222 of eNB 112, the new information field 320, which serves as the QCL signaling message 210, may be configured to identify the cell index or carrier index or ID of a configured carrier 204 of eNB 108, or carrier 220 of eNB 112 that is quasi co-located with the secondary carrier of the serving eNB 108 or secondary carrier 220 of neighboring eNB 112 for which a QCL signaling message is provided. Multiple ServCellIndex-r12 fields 320 may be included in the message 310 as needed to identify multiple quasi co-located secondary carriers 206 and/or 222. In general, a secondary carrier may be QCL with a primary or another secondary carrier that transmits CRS. For example, if a UE is configured with multiple carriers of a neighbor eNB (all of which are secondary carriers), the QCL signaling should indicate which CRS of the secondary carriers may be used by the UE for synchronization.

Figure 4:
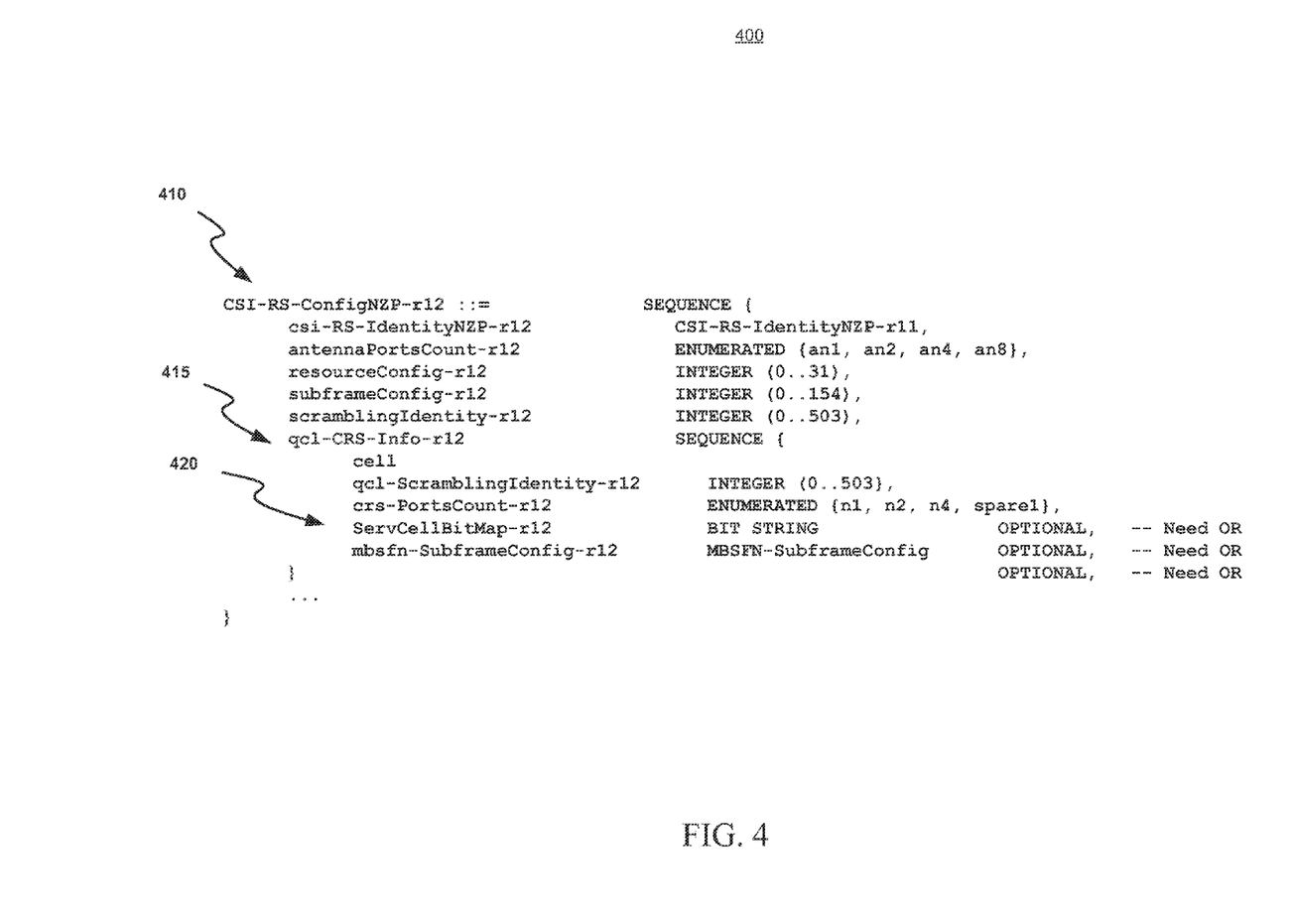
FIG. 4 illustrates a data structure associated with another example embodiment consistent with the present disclosure.

FIG. 4 illustrates a data structure 400 associated with another example embodiment consistent with the present disclosure. In an LTE or LTE-A system, primary carrier 204 of serving eNB 108 may send an RRC message 410 to the UE 110, referred to as CSI-RS-ConfigNZP-r12, which includes a new information field 420, ServCellBitMap-r12 within the qcl-CRS-Info-r12 information element 315. The qcl-CRS-Info-r12 information element 415 may be configured when the UE is configured for transmission mode 10 employing QCL behavior type B. This new information field 420, which serves as the QCL signaling message 210, may be configured such that one or more bits are associated with each (or a subset) of the configured carriers of 108 and the bit values indicate whether the primary (or associated secondary) carrier is quasi co-located or not quasi co-located with the secondary carrier for which the QCL signaling message is provided. The bit values may also be configured to indicate the extent of the QCL between the secondary and primary eNBs. For example, the QCL may include one or more of the following synchronization parameters: Doppler shift, Doppler spread, delay spread, average delay and average gain.

In some embodiments, the QCL signaling message 210 may alternatively signal a new QCL behavior type C for the UE configured in the transmission mode 10 on that carrier.

Type C behavior may indicate, to the UE, that antenna ports 5 and 7-22 of the secondary carrier 206 are quasi co-located with each other and with antenna ports 0-3, 5 and 7-22 of the primary carrier with respect to Doppler shift, Doppler spread, delay spread and average delay. Additionally, type C behavior may also provide that a Reference Signal Receive Power (RSRP) measurement of the CRS from the primary carrier 204 may be used by the UE as the RSRP of the QCL-ed secondary carrier 206, for example for mobility management. In other words, type C behavior may indicate that all reference signals transmitted by the primary carrier 204 are quasi co-located with all reference signals that could be transmitted by the secondary carrier 206.

In some embodiments, the QCL signaling message 210 may alternatively be configured to indicate that one, or all, or a pre-determined subset of the secondary carriers are quasi co-located with the primary carrier 204.

Figure 5:
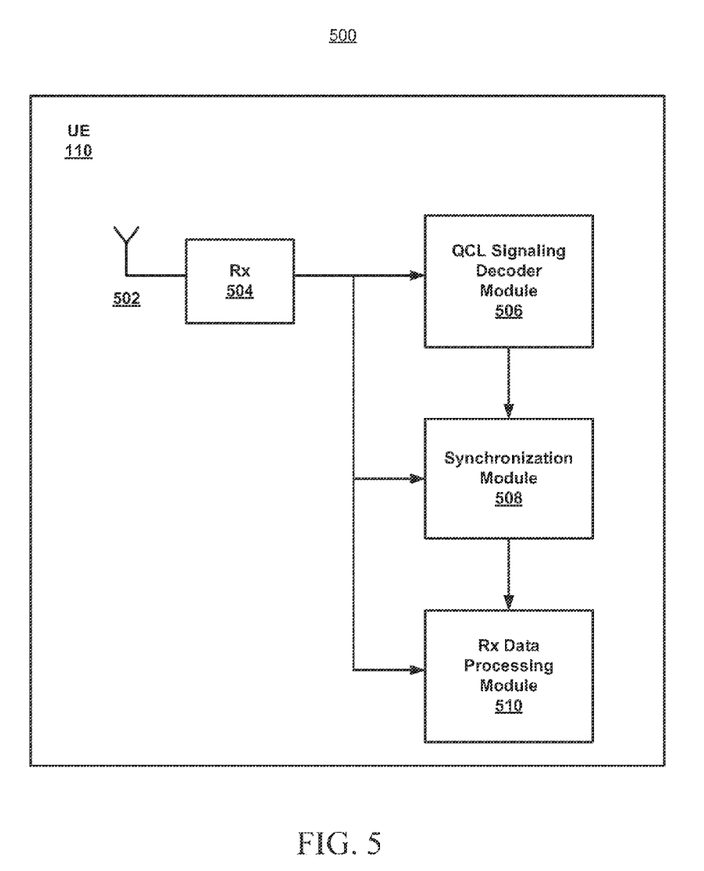
FIG. 5 illustrates a block diagram of another example embodiment consistent with the present disclosure.

FIG. 5 illustrates a block diagram 500 of another example embodiment consistent with the present disclosure. UE 110 is shown to include a receiver circuit 504 (and associated antenna 502), a QCL signaling decoder module 506, a synchronization module 508 and a received data processing module 510. The receiver circuit 504 may be configured to receive QCL signaling messages 210, and CRS and CSI-RS messages 212 from a primary carrier 204 operating in a legacy carrier mode and CSI-RS messages for the secondary carriers operating in a legacy or new carrier type modes. The QCL signaling messages 210 may identify one or more secondary carriers 206 that are quasi co-located with the primary carrier 204. The QCL signaling messages 210 of the secondary carrier may also identify one or more secondary carriers 222 that are quasi co-located with the secondary carrier 220 configured in the legacy carrier mode. The QCL signaling decoder module 506 may be configured to decode the QCL signaling messages 210 and determine one or more QCL synchronization parameters, which may include Doppler shift, Doppler spread, delay spread, average delay and average gain.

The synchronization module 508 may be configured to synchronize the UE 110 with one of the QCL secondary carriers 206 based at least in part on the QCL synchronization parameters associated with from the CRS signal 212 received from the primary carrier 204 of the serving 108.

Received data processing module 510 may be configured to process other data or control messages received from primary carrier 204 and/or QCL secondary carriers 206, for example any messages or signals sent to the UE 110 over the PDSCH channel.

In some embodiments, the UE 110 may perform measurements of Reference Signal Receive Power (RSRP) on the CRS transmitted from the primary carrier 204, for example for mobility management. These RSRP measurements may also be applied to, or considered valid as, the RSRP of the QCL-ed secondary carriers 206.

Figure 6:
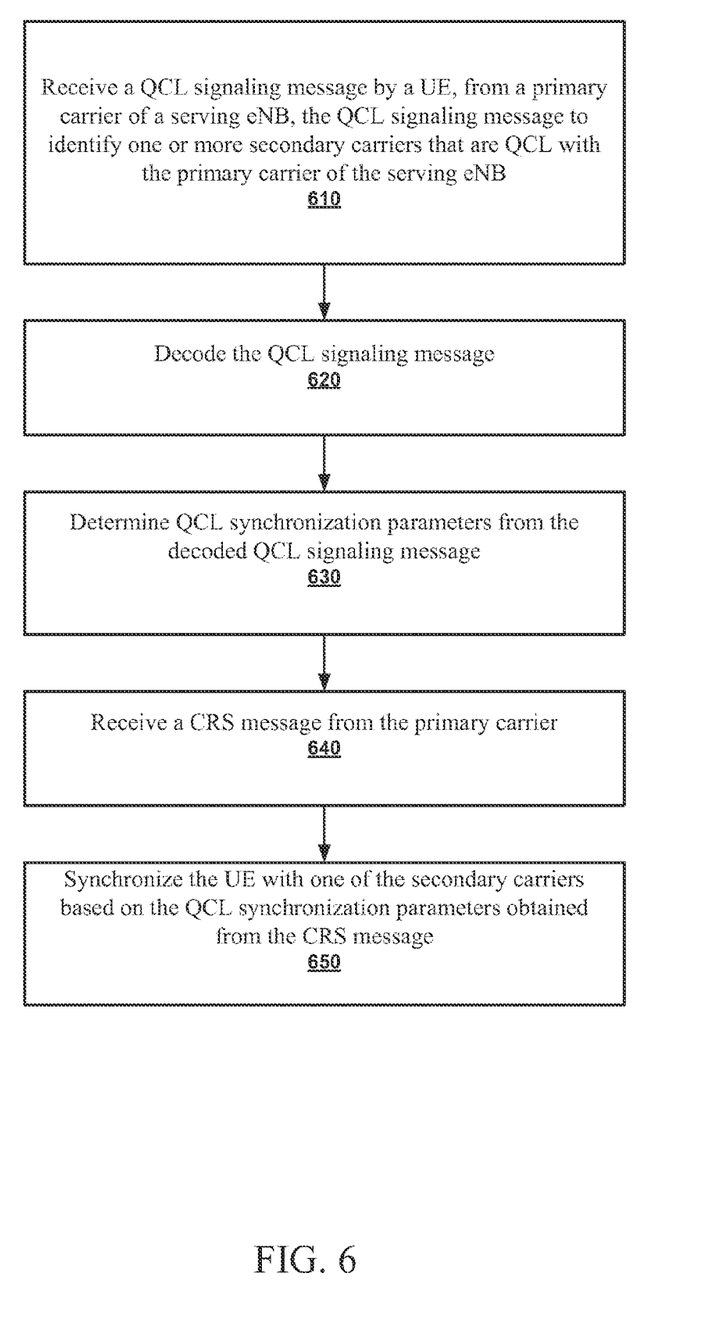
FIG. 6 illustrates a flowchart of operations of an example embodiment consistent with the present disclosure.

FIG. 6 illustrates a flowchart of operations 600 of an example embodiment consistent with the present disclosure. At operation 610, a Quasi Co-location (QCL) signaling message is received by a User Equipment (UE), from a primary carrier of the serving evolved Node B (eNB). The QCL signaling message is configured to identify one or more secondary carriers that are Quasi Co-located with the primary carrier of the serving eNB. The secondary carriers are configured to operate in a non-standalone New Carrier Type (NCT) mode. At operation 620, the QCL signaling message is decoded. At operation 630, QCL synchronization parameters are determined from the decoded QCL signaling message. At operation 640, a Cell Specific Reference Signal (CRS) message is received from the primary carrier. At operation 650, the UE is synchronized with one of the secondary carriers based on the QCL synchronization parameters obtained from the CRS message.

Figure 7:
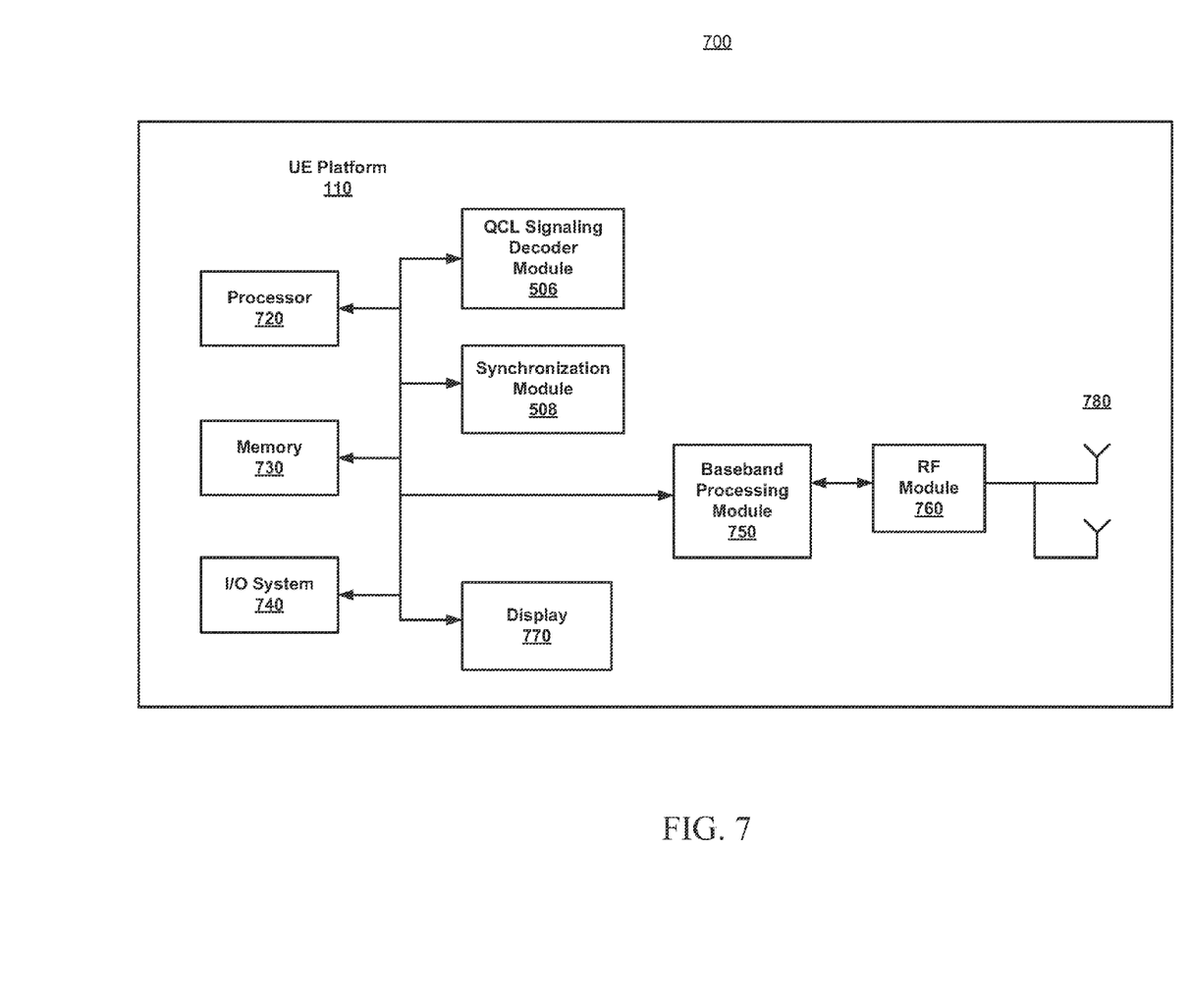
FIG. 7 illustrates a platform of one example embodiment consistent with the present disclosure.

FIG. 7 illustrates a platform 700 of one example embodiment consistent with the present disclosure, for example a UE platform 110. The platform 110 may be a mobile communication device, such as, for example, a UE device (smartphone), a tablet, a laptop computing device or any other device configured to transmit or receive wireless signals. In some embodiments, platform 110 may comprise a processor 720, memory 730, an input/output (I/O) system 740, a display/keyboard or other type of user interface (UI) 770 such as, for example, a touchscreen. Platform 110 may also comprise QCL signaling decoder module 506 and synchronization module 508, as previously described. Platform 110 may further comprise a baseband processing module 750 and an RF processing module 760 as well as one or more antennas 780 which may form part of a Multiple Input Multiple Output (MIMO) antenna system. Any number of platforms 110 may transmit or receive signals through RF module 760 and antennas 780 over a wireless network which may be an LTE or LTE-A wireless network.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides devices, methods, systems and computer-readable storage medium for Cross-Carrier Quasi Co-Location Signaling in an NCT Wireless Network. The following examples pertain to further embodiments.

According to one aspect there is provided a UE. The UE may include a receiver circuit to receive a Quasi Co-location (QCL) signaling message from a primary carrier of a serving evolved Node B (eNB), the QCL signaling message to identify one or more secondary carriers, the secondary carriers Quasi Co-located with the primary carrier of the serving eNB. The UE of this example may also include a QCL signal decoding module to decode the QCL signaling message and to determine QCL synchronization parameters. The WLAN EM of this example may further include a synchronization module to synchronize the UE with one of the secondary carriers based on the QCL synchronization parameters obtained from a Cell Specific Reference Signal (CRS) message received from the primary carrier.

Another example UE includes the forgoing components and the QCL signaling message is further to identify one or more neighbor eNB secondary carriers, one of the neighbor eNB secondary carriers QCL with one other of the neighbor eNB secondary carriers.

Another example UE includes the forgoing components and the QCL synchronization parameters include Doppler shift and Doppler spread.

Another example UE includes the forgoing components and the QCL synchronization parameters include delay spread and average delay.

Another example UE includes the forgoing components and the QCL synchronization parameters include average gain.

Another example UE includes the forgoing components and a Reference Signal Receive Power (RSRP) measurement of the CRS message received from the primary carrier is employed as the RSRP of the secondary carrier.

Another example UE includes the forgoing components and the QCL signaling message is a Channel State Information Reference Signal (CSI-RS) configuration message (CSI-RS-ConfigNZP-r12) including one or more cell indices, each of the cell indices identifying one of the secondary carriers.

Another example UE includes the forgoing components and the primary carrier operates in a legacy carrier mode and the secondary carriers operate in a non-standalone New Carrier Type (NCT) mode.

Another example UE includes the forgoing components and the UE is configured to operate in transmission mode 10 employing QCL type B.

According to another aspect there is provided a serving eNB. The serving eNB may include a primary carrier and a secondary carrier Quasi Co-located (QCL) with the primary carrier. The primary carrier of this example may also be configured to transmit a QCL signaling message to a User Equipment (UE) to identify the secondary carrier as QCL with the primary carrier and to further identify QCL synchronization parameters. The primary carrier of this example may further be configured to transmit a Cell Specific Reference Signal (CRS) to the UE, the CRS associated with the QCL synchronization parameters.

Another example serving eNB includes the forgoing components and the QCL signaling message is further to identify one or more neighbor eNB secondary carriers, one of the neighbor eNB secondary carriers QCL with one other of the neighbor eNB secondary carriers Another example serving eNB includes the forgoing components and the QCL synchronization parameters include Doppler shift and Doppler spread.

Another example serving eNB includes the forgoing components and the QCL synchronization parameters include delay spread and average delay.

Another example serving eNB includes the forgoing components and the QCL synchronization parameters include average gain.

Another example serving eNB includes the forgoing components and a Reference Signal Receive Power (RSRP) measurement of the CRS message transmitted to the UE from the primary carrier is provided as the RSRP of the secondary carrier.

Another example serving eNB includes the forgoing components and the QCL signaling message is a Channel State Information Reference Signal (CSI-RS) configuration message (CSI-RS-ConfigNZP-r12) including one or more cell indices, each of the cell indices identifying one of the secondary carriers.

Another example serving eNB includes the forgoing components and the primary carrier operates in a legacy carrier mode and the secondary carrier operates in a non-standalone New Carrier Type (NCT) mode.

Another example serving eNB includes the forgoing components and the primary carrier configures the UE to operate in transmission mode 10 employing QCL type B.

According to another aspect there is provided a method. The method may include receiving a Quasi Co-location (QCL) signaling message by a User Equipment (UE), from a primary carrier of a serving evolved Node B (eNB), the QCL signaling message to identify one or more secondary carriers, the secondary carriers QCL with the primary carrier of the serving eNB. The method of this example may also include decoding the QCL signaling message. The method of this example may further include determining QCL synchronization parameters from the decoded QCL signaling message. The method of this example may further include receiving a Cell Specific Reference Signal (CRS) message from the primary carrier. The method of this example may further include synchronizing the UE with one of the secondary carriers based on the QCL synchronization parameters obtained from the CRS message.

Another example method includes the forgoing operations and the QCL signaling message is further to identify one or more neighbor eNB secondary carriers, one of the neighbor eNB secondary carriers QCL with one other of the neighbor eNB secondary carriers.

Another example method includes the forgoing operations and the QCL synchronization parameters include Doppler shift and Doppler spread.

Another example method includes the forgoing operations and the QCL synchronization parameters include delay spread and average delay.

Another example method includes the forgoing operations and the QCL synchronization parameters include average gain.

Another example method includes the forgoing operations and further includes measuring a Reference Signal Receive Power (RSRP) of the CRS message received from the primary carrier and employing the measured RSRP as an RSRP of the secondary carrier.

Another example method includes the forgoing operations and the QCL signaling message is a Channel State Information Reference Signal (CSI-RS) configuration message (CSI-RS-ConfigNZP-r12) including one or more cell indices, each of the cell indices identifying one of the secondary carriers.

Another example method includes the forgoing operations and further includes operating the primary carrier in a legacy carrier mode and operating the secondary carriers in a non-standalone New Carrier Type (NCT) mode.

Another example method includes the forgoing operations and further includes configuring the UE to operate in transmission mode 10 employing QCL type B.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. User Equipment (UE) comprising:
a receiver circuit to receive a Quasi Co-location (QCL) signaling message from a primary carrier of a serving evolved Node B (eNB), said QCL signaling message to identify one or more secondary carriers, said secondary carriers Quasi Co-located with said primary carrier of said serving eNB;
a QCL signal decoding module to decode said QCL signaling message and to determine QCL synchronization parameters; and
a synchronization module to synchronize said UE with one of said secondary carriers based on said QCL synchronization parameters obtained from a Cell Specific Reference Signal (CRS) message received from said primary carrier;
wherein:
said primary carrier is a legacy carrier type;
said primary carrier provides signals to said UE to identify which secondary carriers are QCL; and
said one or more secondary carriers are a non-standalone New Carrier Type.

2. The UE of claim 1, wherein said QCL signaling message is further to identify one or more neighbor eNB secondary carriers, one of said neighbor eNB secondary carriers QCL with one other of said neighbor eNB secondary carriers.

3. The UE of claim 1, wherein said QCL synchronization parameters include Doppler shift and Doppler spread.

4. The UE of claim 1, wherein said QCL synchronization parameters include delay spread and average delay.

5. The UE of claim 1, wherein said QCL synchronization parameters include average gain.

6. The UE of claim 1, wherein a Reference Signal Receive Power (RSRP) measurement of said CRS message received from said primary carrier is employed as the RSRP of said secondary carrier.

7. The UE of claim 1, wherein said QCL signaling message is a Channel State Information Reference Signal (CSI-RS) configuration message (CSI-RS-ConfigNZP-r12) comprising one or more cell indices, each of said cell indices identifying one of said secondary carriers.

8. The UE of claim 1, wherein said primary carrier operates in a legacy carrier mode and said secondary carriers operate in a non-standalone New Carrier Type (NCT) mode.

9. The UE of claim 1, wherein said UE is configured to operate in transmission mode 10 employing QCL type B.

10. An article of manufacture comprising at least one non-transitory computer readable storage medium, a processor, and instructions encoded in said non-transitory computer readable storage medium, said instructions being used with said processor to effect:
providing a primary carrier;
providing a secondary carrier Quasi Co-located (QCL) with said primary carrier;
wherein:
said primary carrier is a legacy carrier type;
said primary carrier provides cell-specific reference signals to said user equipment;
said primary carrier provides a QCL signal to a user equipment;
said QCL signal identifies said secondary carrier as QCL with said primary carrier;
said QCL signal further provides QCL synchronization parameters
said primary carrier provides signals to said user equipment to identify which secondary carriers are QCL; and
said one or more secondary carriers are a non-standalone New Carrier Type.

11. The article of manufacture of claim 10, wherein said QCL signaling message is further to identify one or more neighbor eNB secondary carriers, one of said neighbor eNB secondary carriers QCL with one other of said neighbor eNB secondary carriers.

12. The article of manufacture of claim 10, wherein said QCL synchronization parameters include Doppler shift and Doppler spread.

13. The article of manufacture of claim 10, wherein said QCL synchronization parameters include delay spread and average delay.

14. The article of manufacture of claim 10, wherein said QCL synchronization parameters include average gain.

15. The article of manufacture of claim 10, said instructions further being used with said processor to effect:
receiving a Reference Signal Receive Power (RSRP) measurement of said CRS message transmitted to said user equipment; and
utilizing said RSRP measurement as a RSRP for a secondary carrier;
wherein a Reference Signal Receive Power (RSRP) measurement of said CRS message transmitted to said UE from said primary carrier is provided as the RSRP of said secondary carrier.

16. The article of manufacture of claim 10, wherein said QCL signaling message is a Channel State Information Reference Signal (CSI-RS) configuration message (CSI-RS-ConfigNZP-r12) comprising one or more cell indices, each of said cell indices identifying one of said secondary carriers.

17. The article of manufacture of claim 10, wherein said primary carrier configures said UE to operate in transmission mode 10 employing QCL type B.

18. A method comprising:
receiving a primary carrier by user equipment, said primary carrier being provided by an eNB, said primary carrier comprising Quasi Co-location (QCL) signaling message, said QCL signaling message identifying one or more secondary carriers, said secondary carriers QCL with said primary carrier of said serving eNB;
decoding said QCL signaling message;
determining QCL synchronization parameters from said decoded QCL signaling message;
receiving a Cell Specific Reference Signal (CRS) message from said primary carrier; and
synchronizing said UE with one of said secondary carriers based on said QCL synchronization parameters obtained from said CRS message
wherein:
said primary carrier is a legacy carrier type;
said one or more secondary carriers are a non-standalone New Carrier Type.

19. The method of claim 18, wherein said QCL signaling message is further to identify one or more neighbor eNB secondary carriers, one of said neighbor eNB secondary carriers QCL with one other of said neighbor eNB secondary carriers.

20. The method of claim 18, wherein said QCL synchronization parameters include Doppler shift and Doppler spread.

21. The method of claim 18, wherein said QCL synchronization parameters include delay spread and average delay.

22. The method of claim 18, wherein said QCL synchronization parameters include average gain.

23. The method of claim 18, further comprising measuring a Reference Signal Receive Power (RSRP) of said CRS message received from said primary carrier and employing said measured RSRP as an RSRP of said secondary carrier.

24. The method of claim 18, wherein said QCL signaling message is a Channel State Information Reference Signal (CSI-RS) configuration message (CSI-RS-ConfigNZP-r12) comprising one or more cell indices, each of said cell indices identifying one of said secondary carriers.

* * * * *